June 19, 1962  R. J. OSHEI ET AL  3,039,555
VEHICLE DOOR LOCKING SYSTEM
Filed Dec. 18, 1958  2 Sheets-Sheet 1
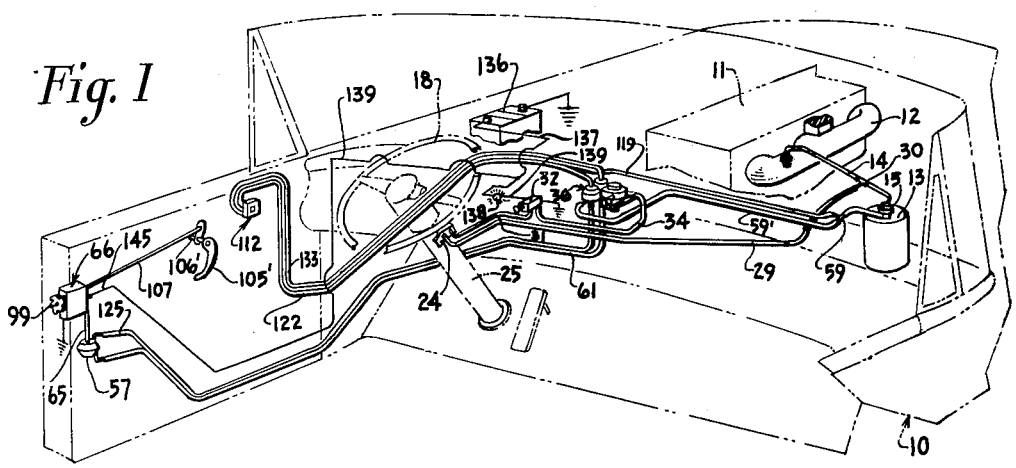
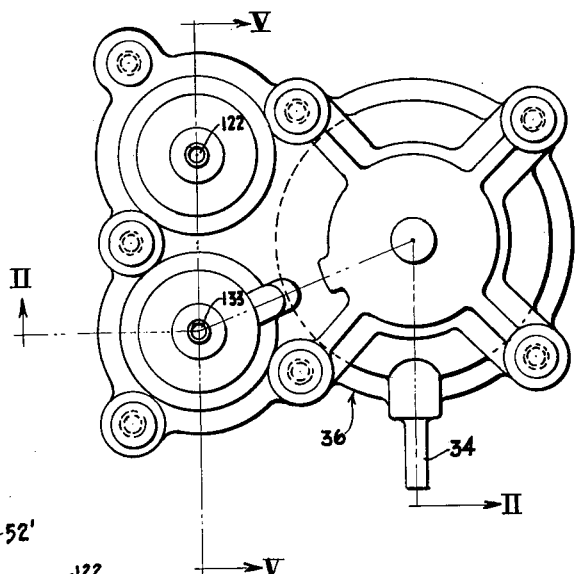
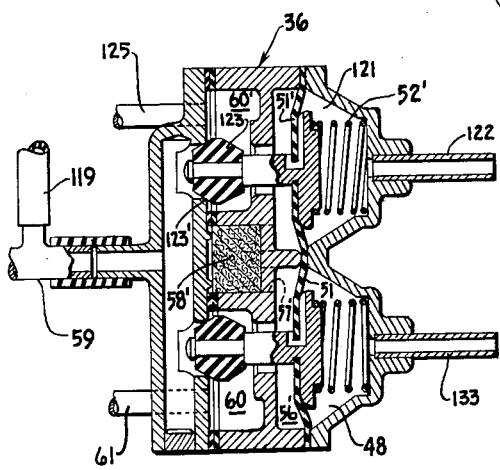
INVENTOR.
REED J. OSHEI and
BY WILLIAM C. RIESTER
Bean Brooks Buckley & Bean
ATTORNEYS

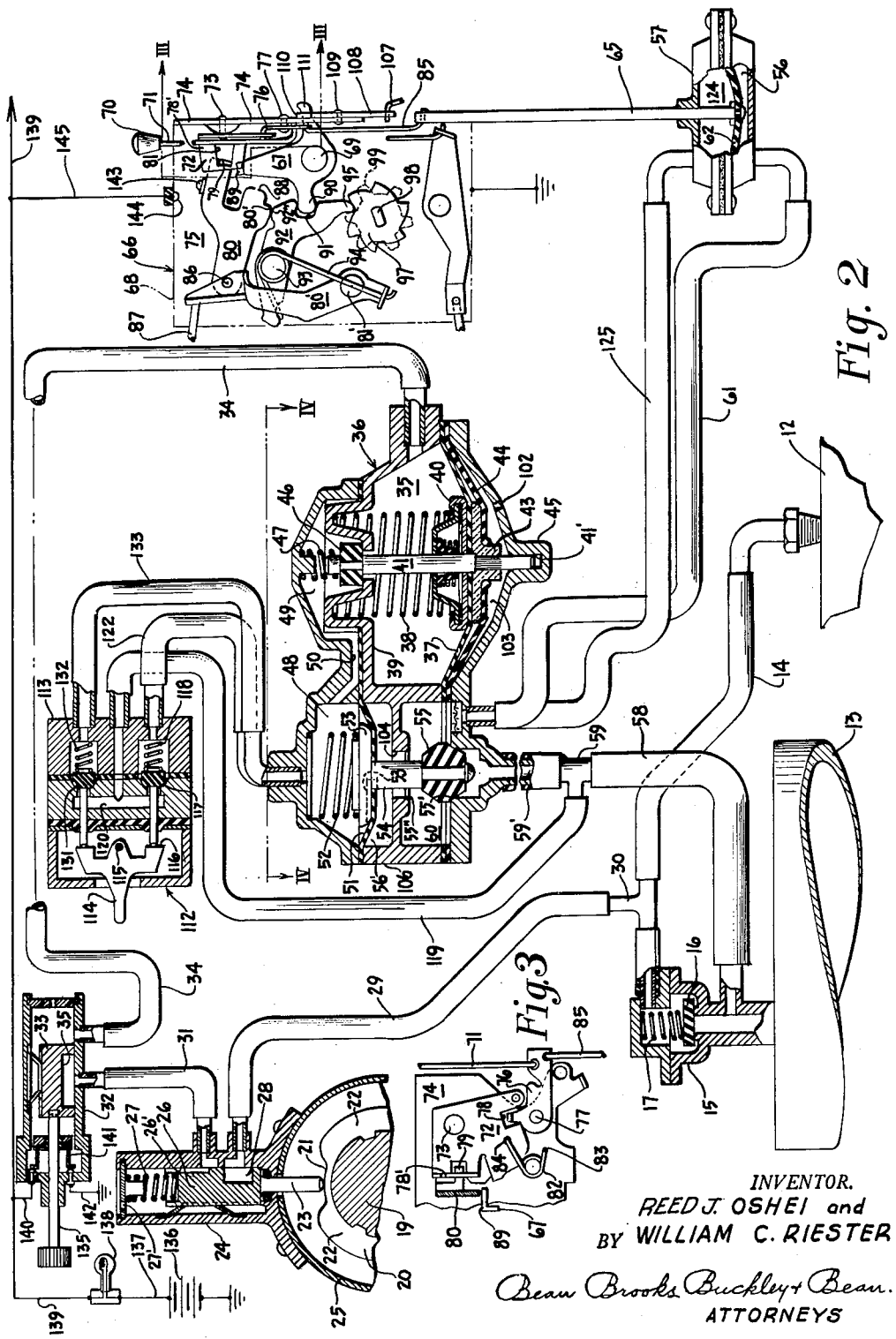

United States Patent Office
3,039,555
Patented June 19, 1962

3,039,555
VEHICLE DOOR LOCKING SYSTEM
Reed J. Oshei, Snyder, and William C. Riester, Williamsville, N.Y., assignors to Trico Products Corporation, Buffalo, N.Y.
Filed Dec. 18, 1958, Ser. No. 781,263
10 Claims. (Cl. 180—82)

This invention relates to an improved locking system for vehicle doors.

It is one object of the present invention to provide an improved locking system which will selectively either cause automatic locking of vehicle doors incidental to the normal operation of the steering apparatus of the vehicle or which will permit the vehicle door locks to be manually locked or unlocked from a remote position in the event that the automatic locking arrangement is purposely deactivated. While it is desirable to automatically lock vehicle doors against unauthorized intrusion, it is also desirable to purposely deactivate the automatic locking apparatus when a large number of passenger pick-ups are being made. If the automatic locking apparatus were not deactivated under these circumstances, the vehicle operator would be subjected to the inconvenience of unlocking the doors each time a passenger was to enter the vehicle. However, notwithstanding that the automatic locking apparatus is deactivated, the remote manual door locking control will permit the doors to be locked by the operator if this becomes necessary. Whenever the passenger pick-ups have been completed, the vehicle operator can return the system to a condition wherein the automatic locking apparatus is always effective for protecting the vehicle against unauthorized intrusion.

It is another object of the present invention to provide an alerting arrangement for the above-described system, which not only alerts the vehicle operator when only the manual locking system for the vhicle is in operation, but also alerts the vehicle operator when the automatic locking system is in operation, but the door locks are not yet locked.

A further object of the present invention is to provide an improved automatic locking system for a vehicle wherein the same control apparatus which causes automatic locking of the vehicle doors also prevents the doors from being automatically locked against reentry when the vehicle is left unattended.

A still further object of the present invention is to provide an improved fast acting distributor valve for a fluid pressure actuated vehicle door locking system. In accordance with this object, the improved valve, in response to a stimulus, instantly establishes communication between a fluid pressure motor and a fluid pressure source and maintains this communication for a sufficiently long time to insure door locking and then automatically returns to a neutral condition wherein it terminates this communication, notwithstanding that the stimulus is still sensed by the valve. The returning of the valve to a neutral condition permits the door lock to be manually unlocked from within the vehicle without interference from the door locking motor. Furthermore, when the stimulus is removed, structure within the valve causes it to substantially instantaneously return to a condition wherein it will be ready to reestablish the foregoing communication when the stimulus is again sensed. Thus the preparedness of the system to effect instantaneous door locking is assured.

Other objects and attendant advantages of the present invention will readily be perceived hereafter, and the present invention will be more fully understood when the following portions of this specification are read in conjunction with the accompanying drawings wherein:

FIG. 1 is a fragmentary perspective view of a vehicle mounting the improved automatic locking arrangement of the present invention;

FIG. 2 is an enlarged diagrammatic view, partially in cross-section, of the salient components of the door locking system, the distributor valve portion of FIG. 2 being taken along line II—II of FIG. 4;

FIG. 3 is a detail view of the lock structure taken along line III—III of FIG. 2;

FIG. 4 is a plan view of the distributor valve taken along line IV—IV of FIG. 2; and FIG. 5 is a cross-sectional view of the distributor valve taken along line V—V of FIG. 4.

The door locking system is installed in the vehicle 10 (FIG. 1) having an engine 11 with the usual intake manifold 12. As can be seen in FIGS. 1 and 2, a vacuum tank 13 is coupled to manifold 12 by conduit 14. A check valve 15 including valve element 16 (FIG. 2) and biasing spring 17 is interposed between conduit 14 and vacuum tank 13. As is well known in the art, vacuum tank 13 will be evacuated during periods of high manifold vacuum, and this vacuum will be retained within the tank due to the conventional operation of check valve 15 during periods of low manifold vacuum.

One aspect of the present invention is to automatically lock the vehicle doors after the vehicle has been placed in operation in order to safeguard the occupants of the vehicle against unauthorized intrusion. When the vehicle has been placed in operation, the steering wheel 18 must, of necessity, be manipulated. Mounted on the steering column 19 (FIG. 2) is a cam plate 20. This cam plate has a central cutaway portion 21 and raised portions 22 to either side thereof. When the vehcile is travelling a straight path, the steering column 19 is in the position shown in FIG. 2. However, whenever the steering wheel is turned, as it must be at some time during the vehicle operation, one of the raised cam portions 22 will engage stem 23 of valve 24 which is suitably mounted on the housing 25 of the steering column. When this occurs, slide valve 26 will be moved upwardly against the bias of spring 27. The groove 28 in slide valve 26 will therefore cause communication between conduit 31 and conduit 29, which is in communication with the engine intake manifold 12 through T 30 and conduit 14. A valve 32 is coupled to the end of conduit 31 which is remote from valve 24. Valve 32 is normally in a position wherein slide valve 33 therein permits communication between conduits 31 and 34 through groove 35. Other aspects of valve 32 will be described in detail hereafter. Conduit 34, in turn, is in communication with chamber 35 of distributor valve 36.

When the vacuum in engine intake manifold 12 is sensed in chamber 35 of valve 36 through the above described conduits in response to the actuation of valve 24, flexible diaphragm 37 in valve 36 will be pulled upwardly against the bias of spring 38, which is interposed between an upper portion 39 of the valve housing and a spring retainer 40 which is seated on diaphragm 37. A valve stem 41 is rigidly secured to porous fitting 43, a portion of the latter extending through an aperture (not numbered) in flexible diaphragm 44, which is mounted underneath diaphragm 37. The space between diaphragms 37 and 44 cannot ordinarily communicate with the atmosphere except at a controlled rate through fitting 43. Therefore, the upward movement of diaphragm 37 will be accompanied by a corresponding upward movement of both diaphragm 44 and valve stem 41 indirectly carried thereby. The lower end of valve stem 41 is mounted for sliding movement in a slot 41' in the lower portion 45 of the valve housing. The upper end of valve stem 41 has a poppet valve 46 suitably mounted thereon. Thus it can be seen that valve 46 is unseated against the bias of spring 47 when diaphragm 37 is caused to move upwardly when manifold vacuum is permitted to communicate with chamber 35 of valve 36.

The same vacuum which causes the unseating of valve 36 will, therefore, communicate with chamber 48 of valve 36 through chamber 35, chamber 49 and conduit 50. Mounted at one end of chamber 48 is a flexible diaphragm 51 which is biased to its lowermost position by spring 52. When vacuum is experienced in chamber 48, diaphragm 51 will be moved upwardly against the bias of spring 52. The washer 53, which bears on diaphragm 51, carries valve stem 54 which mounts poppet valve 55. The upward movement of diaphragm 51 in response to manifold vacuum will thus cause the movement of valve 55 from lower seat 55′ to upper seat 55″, and reduced air pressure from vacuum tank 13 will therefore communicate with chamber 56 of fluid pressure motor 57 through conduit 58, T 59, conduit 59′, chamber 60 of valve 36, and conduit 61. The existence of vacuum within chamber 56 of motor 57 will cause diaphragm 62 to be pulled downwardly and, in turn, cause shaft 65 affixed thereto to actuate latch-lock 66 to a locked condition.

Latch-lock 66 operates in the following manner: A bell crank lever 67 is pivotally mounted on housing 68 by pin 69. The shaft 71 of a conventional manual door locking and unlocking pin 70 extends through the molding (not shown) of the vehicle door. Shaft 71 is fastened to one end of bell crank lever 76 (FIGS. 2 and 3) which is adapted to pivot about pin 77, the other end of lever 76 fitting within notched recess 78 within link 72. Link 72 is pivotally mounted on pin 73 which extends from flange 74 positioned at a right angle to plate 75 of housing 68. As can be seen from FIG. 3, when shaft 71 is depressed, link 76 will pivot in a clockwise direction, and link 72 will pivot in a counterclockwise direction about its pivot pin 73 to cause the portion 78′ of link 72 to move downwardly and carry prong 79 of lever 80 (FIG. 2) downwardly with it, prong 79 fitting within the slotted portion 81 of link 72 (FIG. 2). It will be noted that a snap spring 82 has one end 83 anchored on flange 74 and the other end 84 anchored in link 72. Thus, when manual locking pin 70 is depressed to a locked condition, it is the snap spring 82 which maintains link 72 in a locked position.

Shaft 65 of fluid pressure motor 60 is coupled to shaft 85 (FIGS. 2 and 3) which is, in turn, coupled to bell crank lever 76. Thus the downward movement of shaft 65 in response to the existence of vacuum in chamber 56 of fluid pressure motor 57 will cause a downward movement of shaft 85 which, in turn, will cause a downward movement of the leg of bell crank lever 76 to which shaft 85 is attached to thereby pivot link 72 to the position shown in FIGS. 2 and 3.

After link 80 has been pivoted in a clockwise direction about pin 86 in the above described manner, the movement of pin 87 to the right, as occurs when the outside door handle (not shown) is manipulated, will cause lever 80′ to pivot clockwise about pin 81′ and cause link 80 (attached to lever 80′ by pin 86) to move to the right in FIG. 2. However, the end 88 of link 80 will not engage flange 89 of bell crank lever 67. Thus, the manipulation of the outside door handle will be ineffective for unlocking the door lock.

It is only after link 80 has been pivoted about pin 86 in a counterclockwise direction that the end 88 thereof may engage flange 89 when the outside door handle is manipulated. When end 88 of link 80 abuts flange 89 of bell crank lever 67 in response to the movement of pin 87 to the right during a door opening operation, lever 67 will pivot in a clockwise direction about pin 69, and the leg 90 of lever 67 which is within the recessed portion 91 of lever 92 will cause the latter to pivot in a counterclockwise direction about its pivot pin 93 against the bias of spring 94. This, in turn, will cause the tongue 95 to cease engagement with ratchet wheel 97 which is, in turn, coaxially mounted on shaft 98 with the rotary door latch 99. When the above-described locking arrangement for the rotary door latch 99 is released, latch 99 is free to move relative to the striker plate (not shown) on the door jamb to permit the vehicle door to be pulled to an open position.

As described in detail above, it can readily be seen that when the steering wheel is turned, there will be communication of vacuum between tank 13 and chamber 56 of fluid pressure motor 57 to effect a door locking operation automatically in response to an act performed during the normal operation of the vehicle. However, it will readily be appreciated that the vehicle operator may leave the steering wheel in a turned condition while the vehicle is at a standstill, and that a passenger may desire to alight from the vehicle while the steering wheel is in this condition. In order to permit the unlatching of the vehicle door by the use of inside door handle 105′ without interference from motor 57, distributor valve 36 automatically returns to a position where it terminates communication between the vacuum tank 13 and chamber 56 of motor 57. More specifically, after diaphragm 44 of valve 36 has followed diaphragm 37 upwardly to open valve 46 during the above-described automatic door locking, spring 47 will cause valve 46 to move downwardly at a controlled rate. This action is obtained because atmospheric air can flow through vent 102, chamber 103, and porous fitting 43 into the chamber between diaphragms 37 and 44. Fitting 43 may be made out of porous bronze such as is commonly used for bearing material, or a suitable porous ceramic substance. Thus, notwithstanding that diaphragm 37 is maintained in an upper position because of the existence of vacuum within chamber 35, diaphragm 44 will return to its position shown in the drawing under the influence of spring 47, and valve 46 will be seated to disrupt communication between vacuum tank 13 and chamber 48 of distributor 36. After this communication is terminated, spring 52 within chamber 48 will cause diaphragm 51 to move downwardly, which, in turn, will cause poppet valve 55 to be returned to its lower seat 55′ to disrupt communication between vacuum tank 13 and chamber 56 of fluid pressure motor 57. The downward movement of diaphragm 51 is possible notwithstanding the existence of vacuum in chamber 48 immediately following the closing of valve 46 because chamber 48 may vent to the atmosphere through conduit 53′ in washer 53, chamber 56′ (FIG. 5), aperture 57′, filtering material 58′, and an aperture (not shown) in the bottom of valve 36. After valve 55 has returned to the position shown in FIG. 2, chamber 56 of fluid pressure motor 60 may communicate with the atmosphere through conduit 61, chamber 60 of valve 36, aperture 104 surrounding valve seat 55″, chamber 56′, aperture 57′, filter 58′ (FIG. 5), and an aperture (not shown) in the bottom of valve 36. The venting of chamber 56 to the atmosphere in the above described manner will permit the door latch-locks 66 to be moved to an unlocked condition by the manipulation of lever 70 or door handle 105′ without interference from the door lock actuating motor 57, notwithstanding that the steering wheel may still be turned to a position wherein it would normally cause locking of the latch-lock. It will be understood that resilient diaphragm 62 of motor 57 is in a downwardly bowed position shown in FIG. 2 when latch-lock 66 is in a locked condition, because the overcenter spring 82 in FIG. 3 maintains shaft 65 in its lowermost position when the door is locked, notwithstanding that chamber 56 of motor 57 may not be exposed to vacuum.

When the inside door handle 105′ (FIG. 1) is pivoted in a clockwise direction about the axis of pin 106′, link 107 will be caused to move to the right. As can be seen from FIG. 2, link 107 is connected to lever 108 which is in turn pivotally mounted to flange 74 as by rivet 109. The upper end 110 of lever 108 extends across lip 111 of bell crank lever 67. The movement of link 107, as described above, will cause end 110 of lever 108 to pivot about pin 109 into the plane of the drawing to thereby engage lip 111 of lever 67. This will cause lever 67 to pivot clockwise and cause lip 95 of lever 92 to be disengaged from ratchet wheel 97 to permit the door to be opened.

As described above, the unlocking of the vehicle doors may be effected by means of manual unlocking pin 70, or door handle 105'. However, the vehicle operator may desire to unlock a vehicle door without the inconvenience of reaching over to perform this feat manually. To this end, a remote control is provided within the vehicle. This control consists of a manually actuable valve 112 (FIGS. 1 and 2) which may be mounted on the vehicle door, as shown, or on the vehicle dashboard. Valve 112 consists of a housing 113 having a lever 114 pivotally mounted thereon by pin 115. When it is desired to unlock the doors from a remote position, lever 114 is pivoted in a counterclockwise direction (FIG. 2) and the end 116 thereof will depress valve 117 against the bias of spring 118. This will permit the vacuum in tank 13 to communicate with chamber 121 (FIG. 5) of distributor valve 36 through conduit 58, T 59, conduit 119, chamber 120 of valve 112, and conduit 122. This will cause valve 123 (FIG. 5) to be moved from its seat 123' when diaphragm 51' is deflected to the right (FIG. 5), against the bias of spring 52' in response to the existence of vacuum within chamber 121. When valve 123 is thus unseated, vacuum in tank 13, will therefore communicate with chamber 124 of motor 57, through conduit 58, T 59, chamber 60', and conduit 125. This, in turn, will cause flexible diaphragm 62 of motor 57 to deflect upwardly to carry shaft 65 upwardly also which, in turn, will cause shaft 85 to move bell crank lever 76 (FIG. 3) in a counterclockwise direction about pivot pin 77 to cause link 72 to move to a position whereby it places latch-lock 66 in an unlocked condition, as described above. When latch-lock 66 is placed in an unlocked condition, the vehicle door may be opened from the outside by manipulating the door handle (not shown) which, in turn, causes pin 87 to move to the right (FIG. 2) to cause the end 88 of link 80 to engage flange 89 to effect an unlocking of the vehicle door.

If, for any reason, it is desired to manually lock all the doors from a remote position, it is merely necessary to pivot lever 114 of valve 112 in a clockwise direction to cause valve 131 to unseat against the bias of spring 132. This will permit vacuum to communicate between tank 13 and chamber 48 (FIG. 2) of valve 36 through conduit 58, T 59, conduit 119, chamber 120 of valve 112, and conduit 133. The existence of vacuum in chamber 48 will cause diaphragm 51 to deflect upwardly (FIG. 2) to move valve 55 from seat 55'. This will permit vacuum from tank 13 to communicate with chamber 56 of motor 57 through conduit 58, T 59, chamber 60 of valve 36, and conduit 61. When lever 114 of valve 112 is released, the spring 132 will return it to a neutral position, and distributor valve 36 will, in turn, return to the condition shown in FIG. 2 because the atmosphere will bleed into chamber 48, as described in detail above.

As noted above, during most conditions of vehicle operation, it is desirable to have the door locking system in a condition wherein it causes automatic locking of the vehicle doors. However, there are times when it is desirable that the automatic door locking be discontinued temporarily, as when the vehicle is being used to make a large number of passenger pickups. In such a situation, if the automatic door locking system were in operation, the vehicle operator would be subjected to the inconvenience of unlocking the doors manually by the use of valve 112 each time a passenger desired to enter the vehicle. In order to obviate the foregoing inconvenience, above-mentioned valve 32 (FIGS. 1 and 2) is used. When it is desired to render the automatic locking system ineffective, it is merely necessary to pull stem 135 of valve 32 to the left to the position shown in FIG. 2. In the position shown, slider valve 33 will prevent communication between conduits 31 and 34. Therefore, there can be no evacuation of chamber 35 of valve 36 in response to the movement of steering column 19. However, it is to be noted that valve 112 can still be used for manually locking or unlocking latch-locks 66 in the above-described manner.

When valve 32 is in a position wherein it prevents automatic locking of the vehicle doors in response to the normal operation of the vehicle, a circuit will be completed from battery 136 to ground through lead 137, signal lamp 138, lead 139, lead 140, switch 141 mounted on stem 135, and lead 142. Thus, a signaling device is caused to function when the automatic latch-locking structure of the present invention is not being utilized.

A situation may exist wherein valve 32 is in condition to permit automatic locking of door locks 66 in response to normal operation of the vehicle, but for some unexplained reason, locks 66 may be unlocked. Signal lamp 138 is also utilized to alert the vehicle operator of such an occurrence. More specifically, whenever lock 66 is in an unlocked condition, link 80 will assume a position wherein the contactor 143 mounted thereon, engages contactor 144 on the housing of lock 66. In such a situation, a circuit will be completed from battery 136 to ground through lead 137, lamp 138, lead 139, lead 145, contactor 144, contactor 143, and housing 75 of lock 66. It will be further noted that lead 139 also extends to other locks (not shown) in the other doors of the vehicle. Leads which have the same relationship to the other locks as does lead 145 to lock 66 will therefore permit the completion of a circuit through lamp 138 in the event that any of the other locks are in an unlocked condition. It will thus be seen that the same signal system which is utilized to warn the vehicle operator that the automatic locking system has been rendered ineffective by the manipulation of valve 32 will also warn the vehicle operator of the fact that any or all of the vehicle door locks are not locked when the automatic locking system is in operation.

During the course of vehicle operation, the steering column 19 will be turned many times, thereby causing stem 23 of valve 24 to be moved up and down. When valve 24 is in the position shown in the drawings, conduit 31 is vented to the atmosphere through cut-away 26' in slide valve 26 and vent 27'. Venting of conduit 31 to the atmosphere causes a corresponding venting of chamber 35 of valve 36 which permits diaphragm 37 to return to the position shown in the drawing. The next time that vacuum is applied to chamber 35, valve 36 will recycle to relock any of the doors which have been unlocked since the previous valve cycling action.

It will thus be seen that an automatic locking system for a vehicle has been described which is operative to maintain the doors of a vehicle locked without interfering with the unlocking of these doors from within the vehicle. It will further be appreciated that once a vehicle has been brought to a stop and the operator leaves the vehicle, the inaccessibility to the steering wheel from outside of the vehicle will prevent a recycling of valve 36. Thus, the same apparatus within the vehicle which is utilized to initiate an automatic locking operation, also functions to prevent the operator from being inadvertently locked out of the vehicle. More specifically, when the vehicle door is opened by the use of the inside door handle 105', lock 66 will return to an unlocked condition because the portion 92', of lever 92, in moving upwardly when the door handle is manipulated, will engage portion 80' of link 80 and cause the latter to move upwardly to a position which permits the door to be subsequently openend from outside of the vehicle by the manipulation of the outside door handle. It will readily be appreciated that the steering column of a parked vehicle cannot be moved from the outside of the vehicle. Thus, after diaphragm 44 (FIG. 2) has reurned to its lowermost position, the continued existence of vacuum in chamber 35 is ineffective for recycling the door locks to a locked condition. In other words, valve 46 cannot be raised off of its seat until chamber 35 is exposed to atmosphere and then evacuated, and this cannot be done unles the steering column is manipulated. Therefore, the action of distributor valve 36 not only causes automatic locking of the door locks, but also serves as a means for preventing the vehicle operator from being inadvertently locked out of the vehicle.

As discussed in detail above, diaphragm 44 of valve 36 returns to its lowermost position under the urging of spring 47 notwithstanding that diaphragm 37 is maintained in its raised position due to the existence of vacuum within chamber 35. The foregoing action is for the purpose of terminating communication between the fluid pressure source and motor 57, notwithstanding that steering column 19 remains in a motor actuating condition. There are times, however, when the vacuum in chamber 35 is released while diaphragm 37 is in its uppermost position and while diaphragm 44 is in its lowermost position. Under these circumstances, it is desirable to permit the air which is trapped between diaphragms 37 and 44 to be released to the atmosphere immediately. To this end, the lower portion of fitting 43 fits loosely within an aperture (not numbered) in diaphragm 44. When the vacuum above diaphragm 37 is released, the springs tending to force it downwardly tend to compress the air in the chamber defined by diaphragms 37 and 44, and this compression of air forces the upper surface of diaphragm 44 away from the under surface of porous element 43 to permit the air which is thus trapped to be discharged substantially instantaneously through the apertured portion of diaphragm 44. Because of the foregoing construction, the release of pressure is substantially instantaneous, and valve 36 is always instantly placed in condition for subsequent recyling whenever chamber 35 is vented.

While a preferred embodiment of the present invention has been disclosed, it is to be understood that the present invention is not to be limited thereto, but may be otherwise embodied within the scope of the following claims.

What is claimed is:

1. A system for automatically locking the door of a vehicle comprising a door in said vehicle, a lock operatively associated with said door, steering apparatus in said vehicle, means responsive to the normal operation of said steering apparatus for actuating said lock to a locked condition, and means for maintaining said lock in a locked condition after actuation thereof regardless of any subsequent condition of said steering apparatus.

2. A system for automatically locking the door of a vehicle comprising a door in said vehicle, a latch-lock operatively associated with said door, steering apparatus in said vehicle, means responsive to the normal operation of said steering apparatus for actuating said latch-lock to a locked condition, and means for maintaining said lock in a locked condition after the actuation thereof regardless of any subsequent condition of said steering apparatus.

3. A system for automatically locking a vehicle against unauthorized intrusion comprising a door in said vehicle, a latch-lock operatively associated with said door, motor means for selectively actuating said latch-lock, steering apparatus in said vehicle, control means for both causing said motor means to automatically lock said latch-lock in response to the normal operation of said steering apparatus and for preventing automatic locking of said latch-lock when said vehicle is left unattended, and means for maintaining said latch-lock in a locked condition regardless of any subsequent condition of said steering apparatus until said lock is manually unlocked.

4. A system for automatically locking the door of a vehicle comprising a door in said vehicle, a lock operatively associated with said door, steering apparatus in said vehicle, means responsive to the operation of said steering apparatus for actuating said lock to a locked condition, and means for maintaining said lock in a locked condition until it is manually actuated to an unlocked condition regardless of any subsequent condition of said steering apparatus.

5. A system for automatically locking the door of a vehicle comprising a door in said vehicle, a lock operatively associated with said door, means for maintaining said lock in a locked condition until it is manually actuated to an unlocked condition, motor means for actuating said lock, a source of energy, steering apparatus in said vehicle, control means actuable by said steering apparatus for coupling said motor means to said energy source to effect an automatic locking of said vehicle door, and means operatively associated with said control means automatically operable to uncouple said motor means from said energy source to permit said door to be manually unlocked from within the vehicle while said control means are subjected to said energy source, said means for maintaining said lock in a locked condition preventing said door from being opened from outside of said vehicle after said motor means are uncoupled from said energy source.

6. A system for locking a vehicle door comprising a door in said vehicle, a lock operatively associated with said door, automatic means for causing said lock to lock said vehicle door in response to normal operation of a vehicle and for permitting said lock to be maintained in a locked condition regardless of any subsequent operational conditions of said vehicle, first manual control means for selectively causing remote locking or unlocking of said lock when said automatic means are capable of effecting locking of said lock in response to said normal operation of said vehicle, and second manual control means for rendering said automatic means ineffective for locking said lock while permitting said first manual means to remain effective for remote locking or unlocking said lock.

7. A system as set forth in claim 6 including signal means for both indicating when said second control means are actuated to render said automatic locking means ineffective and for indicating when said door is unlocked when said automatic means are in operation.

8. A fluid pressure distributing valve for an automatic door locking system of a vehicle comprising valve means for causing communication betwen a fluid pressure source and a door locking motor in response to the sensing of fluid pressure by said valve, means in said valve for terminating communication between said motor and said fluid pressure source to permit unlocking of said lock without interference from said fluid pressure motor notwithstanding that said valve still senses said fluid pressure, and means for placing said valve in condition to re-establish communication between said fluid pressure motor and said fluid pressure source substantially simultaneously with the termination of the sensing of said fluid pressure.

9. A system for locking a vehicle door comprising a door in said vehicle, a latch lock operatively associated with said door, a source of fluid pressure, a fluid pressure motor operatively coupled to said latch lock, control means responsive to the normal operation of said vehicle for placing said fluid pressure motor in communication with said fluid pressure source to thereby cause said fluid pressure motor to effect locking of said latch lock, means operatively associated with said latch lock for causing it to remain in a locked condition after having once been locked regardless of any subsequent operational condition of said vehicle until such time that said latch lock is manually unlocked, first manually operable means for selectively causing remote actuation of said fluid pressure motor for effecting locking and unlocking of said latch lock when said control means are capable of placing said fluid pressure motor in communication with said fluid pressure source in response to the normal operation of said vehicle, and second manually operable means for rendering said control means ineffective for locking said latch lock in response to the normal operation of the vehicle while permitting said first manual means to remain effective for selective remote locking or unlocking of said latch lock.

10. A system for locking a vehicle door comprising a door in said vehicle, a latch lock operatively associated with said door, a source of fluid pressure, a fluid pressure motor operatively coupled to said latch lock, control means responsive to the normal operation of said vehicle for placing said fluid pressure motor in communication with said fluid pressure source to thereby cause said fluid pressure motor to effect locking of said latch lock, first manually operable means for selectively causing remote actuation of said fluid pressure motor for effecting locking and unlocking of said latch lock when said control means are capable of placing said fluid pressure motor in communication with said fluid pressure source in response to the normal operation of said vehicle, and second manually operable means for rendering said control means ineffective for locking said latch lock in response to the normal operation of the vehicle while permitting said first manual means to remain effective for selective remote locking or unlocking of said latch lock.

References Cited in the file of this patent

UNITED STATES PATENTS

| | | |
|---|---|---|
| 2,139,569 | Alvarado | Dec. 6, 1938 |
| 2,198,862 | Chesler | Apr. 30, 1940 |
| 2,340,424 | Ott | Feb. 1, 1944 |
| 2,901,053 | Lassiter | Aug. 25, 1959 |
| 2,936,843 | Adams et al. | May 17, 1960 |